United States Patent [19]
Tuck

[11] Patent Number: 5,584,047
[45] Date of Patent: Dec. 10, 1996

[54] METHODS AND APPARATUS FOR AUGMENTING SATELLITE BROADCAST SYSTEM

[76] Inventor: Edward F. Tuck, 2412 E. Crescent View Dr., West Covina, Calif. 91790

[21] Appl. No.: 450,601

[22] Filed: May 25, 1995

[51] Int. Cl.⁶ .................................................... H04B 7/185
[52] U.S. Cl. ........................................ 455/13.1; 455/33.2
[58] Field of Search ................................. 455/33.2, 12.1, 455/13.1, 13.3, 3.2; 342/352, 3; 343/914; 348/6

[56] References Cited

U.S. PATENT DOCUMENTS 3,378,837 4/1968 Graves ..................................... 455/12.1

Primary Examiner—Reinhard J. Eisenzopf
Assistant Examiner—Darnell R. Armstrong
Attorney, Agent, or Firm—Anglin & Giaccherini

[57] ABSTRACT

The present invention comprises methods and apparatus for providing programming from both satellites (11) and local sources (L) using a single receiving antenna (32). In a preferred embodiment, beams (18) emanating from a geosynchronous satellite (11) are collected using the main lobe (36) of a home receiving antenna (32), while a rebroadcast signal (26) generated by an airplane (20) circling above the home (H) is simultaneously sensed using a side lobe (38) of the receiving antenna (32). The airplane (20) flies along a path (40) which is a closed loop so that it is always positioned in a region where the aircraft antenna (24) can supply signals (26) to the receiving terminal (28) using the side lobe (38). The present invention may be implemented using any form of airborne platform (20), whether it is manned or unmanned. A wide range of methods may be employed to deliberately enhance the sensitivity of the side lobe (38) of the receiving antenna (32). The invention allows immediate and inexpensive enhancement to existing geostationary broadcast services.

21 Claims, 18 Drawing Sheets

METHODS AND APPARATUS FOR AUGMENTING SATELLITE BROADCAST SYSTEM

FIELD OF THE INVENTION

The present invention relates to the field of satellite broadcast systems. More particularly, this invention comprises methods and apparatus for receiving direct satellite broadcasts and local programming delivered by an airborne platform using a single receiving antenna.

BACKGROUND OF THE INVENTION

A growing portion of the television programming that is viewed by Americans is broadcast directly to home receivers by geosynchronous satellites. These satellites operate in orbits positioned above the Earth's Equator at an altitude of approximately 22,300 miles. Some consumers use relatively large satellite dishes that may be ten or more feet in diameter to receive television programming directly from satellites such as the Galaxy™ and Telstar™ series of spacecraft. In the past year, receivers that employ much smaller antennas that are only about two feet across have been introduced in the United States. These newer and smaller systems obtain signals from powerful new satellites operated by DirecTV™ and USSB™.

One unfortunate consequence of relying on direct broadcast systems is that they rarely, if ever, provide programming from local stations. One possible solution to this problem would be to use high-altitude airplanes to rebroadcast local television stations in the same frequency band used for direct satellite television broadcasting. The satellites that supply direct broadcast signals move in orbits that are synchronized with the rotation of the Earth. A given geosynchronous satellite therefore appears to be in almost exactly the same elevation and azimuth for all viewers in even a large metropolitan area. In contrast, because the airplane is at a much lower altitude than the geosynchronous satellites used for television broadcasting, it cannot be at the same angle for all viewers.

The problem with this approach is that two different antennas would then be required—one for signals emanating from the satellite, and a second oriented to the airplane's position for signals emitted from the aircraft. The viewer would not only be faced with the higher cost of purchasing two different antennas, but would also suffer the inconvenience of having to constantly switch between the two antennas each time he or she wishes to change channels that are not supplied solely by either the satellite or the aircraft.

Other previous attempts to offer broadcast services from a variety of platforms have been met with mixed results. A number of systems are described in the U.S. Patents cited below.

U.S. Pat. No. 4,392,139, issued to Aoyama et al. in 1983, discloses an omni-directional VHF television antenna system for an aircraft.

U.S. Pat. No. 4,218,702, issued to Brocard et al. in 1980, describes a means for remote control of an aircraft video system for surveying ground activity.

U.S. Pat. No. 3,972,045, issued to Perret in 1976, pertains to an apparatus for transporting and entertaining passengers aboard an aircraft with a television system.

U.S. Pat. No. 3,778,007, issued to Kearney, II et al. in 1973, concerns a rod television-guided drone to perform reconnaissance and ordnance delivery.

U.S. Pat. No. 3,406,401, issued to Tillotson in 1968, discloses a synchronous satellite communication system for communicating simultaneously with a number of ground stations.

U.S. Pat. No. 2,748,266, issued to Boyd in 1956, describes a radiant energy relay system having mobile relay signaling stations moving in continuously progressing succession.

U.S. Pat. No. 2,626,348, issued to Nobles in 1953, relates to radio systems employing equipment mounted on aircraft for re-transmitting or relaying programs.

U.S. Pat. No. 2,598,064, issued to Lindenblad in 1952, discloses the transmission of radio signals between remote points.

U.S. Pat. No. 2,509,218, issued to Deloraine in 1950, pertains to a radio multi-channel communicating system adapted for association with predetermined routes.

U.S. Pat. No. 4,253,190, issued to Csonka in 1981, describes a communications system using a mirror kept in outer space by electromagnetic radiation pressure.

U.S. Pat. No. 5,133,081, issued to Mayo in 1992, discloses a remotely controllable message broadcast system including central programming station, remote message transmitters and repeaters.

This problem of designing a system which provides programming from both satellites and local sources without utilizing two different antennas has presented a major challenge to the satellite business. The development of a home receiver that is capable of supplying both local and satellite signals but which is also relatively inexpensive and easy to use would constitute a major technological advance and would satisfy a long felt need within the television and communications industries.

SUMMARY OF THE INVENTION

The present invention is a system which provides programming from both satellites and local sources using a single antenna. Television or other signals are transmitted to receivers primarily intended for use with geostationary satellites, without modification to those receivers or their antennas. An airplane is positioned off-axis to the receiving antennas so as to transmit signals into the antennas' sidelobes. The invention allows immediate and inexpensive enhancement to existing geostationary broadcast services.

In a preferred embodiment, beams emanating from a geosynchronous satellite are collected using the main lobe of a home receiving antenna, while a rebroadcast signal generated by an airplane circling above the home is simultaneously sensed using a side lobe of the receiving antenna. The airplane flies along a path which is a closed loop so that it is always positioned in a region where the aircraft antenna can supply signals to the receiving terminal using the side lobe. The present invention may be implemented using any form of airborne platform, whether it is manned or unmanned.

This approach offers a convenience to the viewer, in that he or she does not need to disconnect his television receiver from the satellite receiver and connect it to a local antenna or cable system to receive local news and other local programming. If the airborne broadcast is provided by the satellite broadcast entity, the service provided would be indistinguishable from terrestrial cable service, except possibly for higher quality. The subscriber might also be able to avoid the additional cost of local terrestrial cable service, if his or her primary reception were poor.

An appreciation of other aims and objectives of the present invention and a more complete and comprehensive understanding of this invention may be achieved by studying the following description of a preferred embodiment and by referring to the accompanying drawings.

DETAILED DESCRIPTION OF PREFERRED AND ALTERNATIVE EMBODIMENTS

Geosynchronous Direct Broadcast Systems

Figure 1:
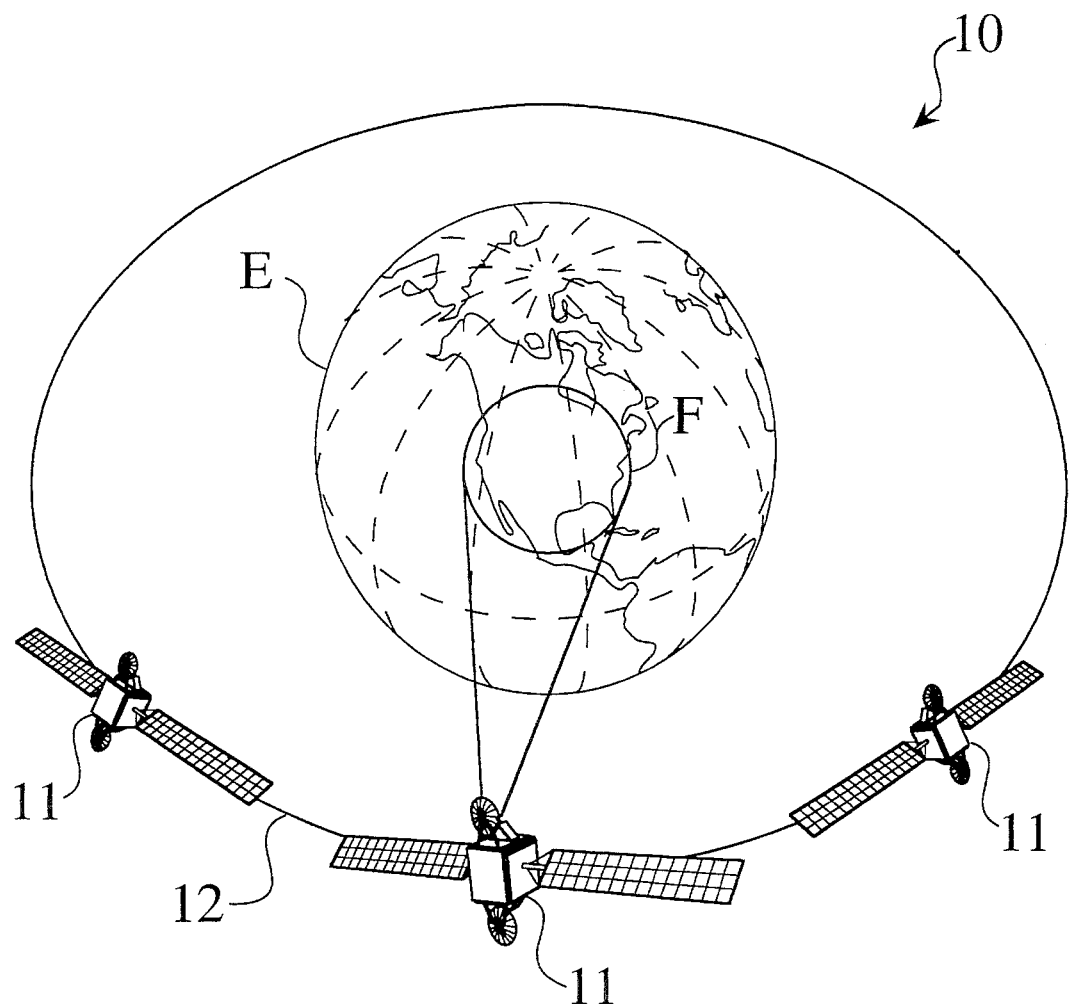
FIG. 1 is a schematic diagram of geosynchronous satellites in Earth orbit.

FIG. 1 furnishes a schematic view 10 of satellites 11 operating in geosynchronous orbit 12 above the Earth E. Each satellite 11 travels along an orbit 12 which is positioned above the Equator, and emits signals that form a footprint F on the surface of the Earth. FIG. 1 is not drawn to scale. For the sake of simplicity, none of the figures which accompany this Specification that portray the relative locations of satellites or aircraft are drawn to scale.

Figure 2:
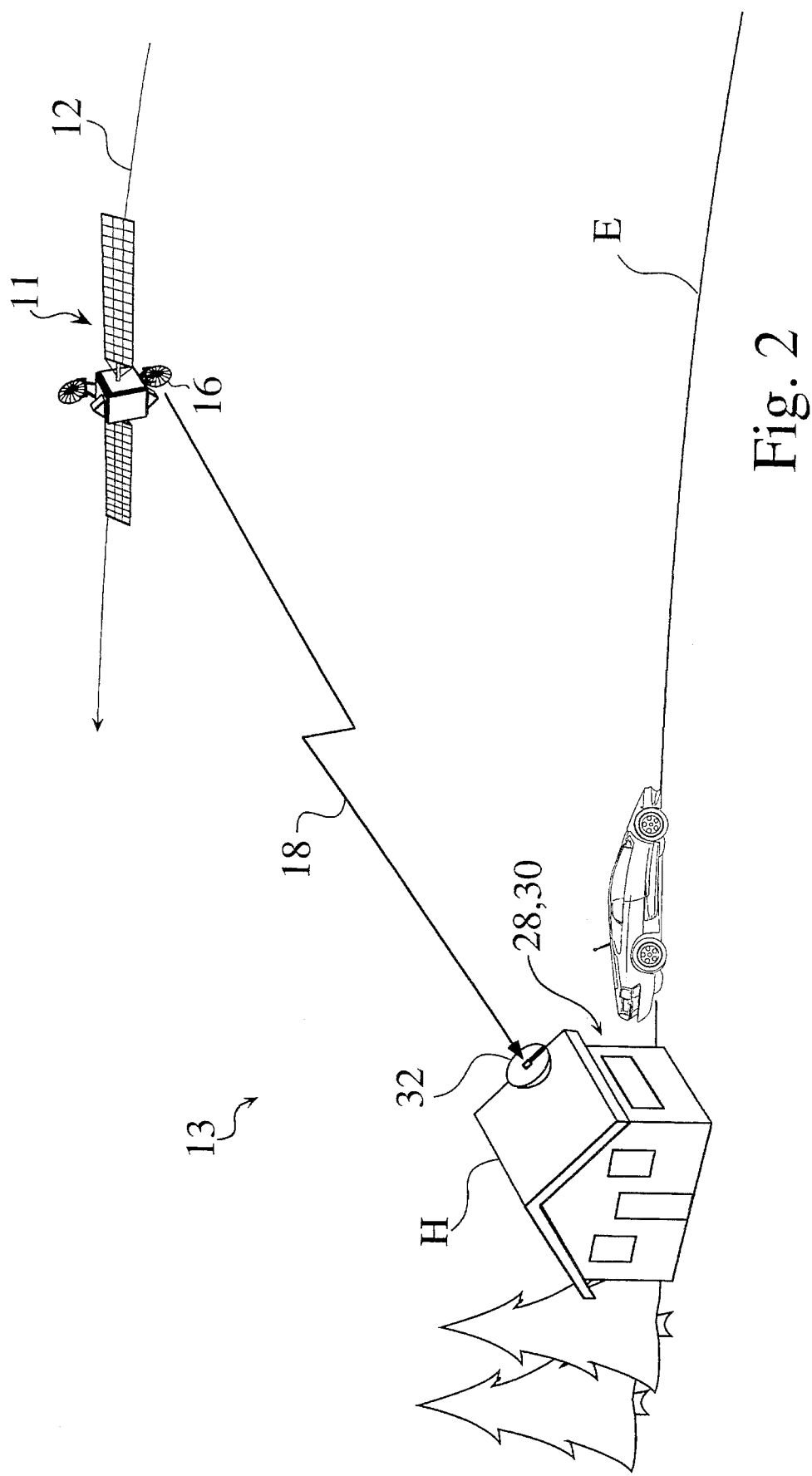
FIG. 2 is a schematic diagram that illustrates a geosynchronous satellite transmitting signals to a receiving antenna mounted on the roof-top of a home.

FIG. 2 is a schematic illustration 13 of a satellite 11 that includes a transponder 14 and antennas 16. Satellite beams of radiation 18 are emitted from the antennas 16 down to a home H and provide television programming to a terminal 28 which includes a receiver 30 and a paraboloidal reflector antenna 32.

A Preferred Embodiment of the Invention

Figure 3A:
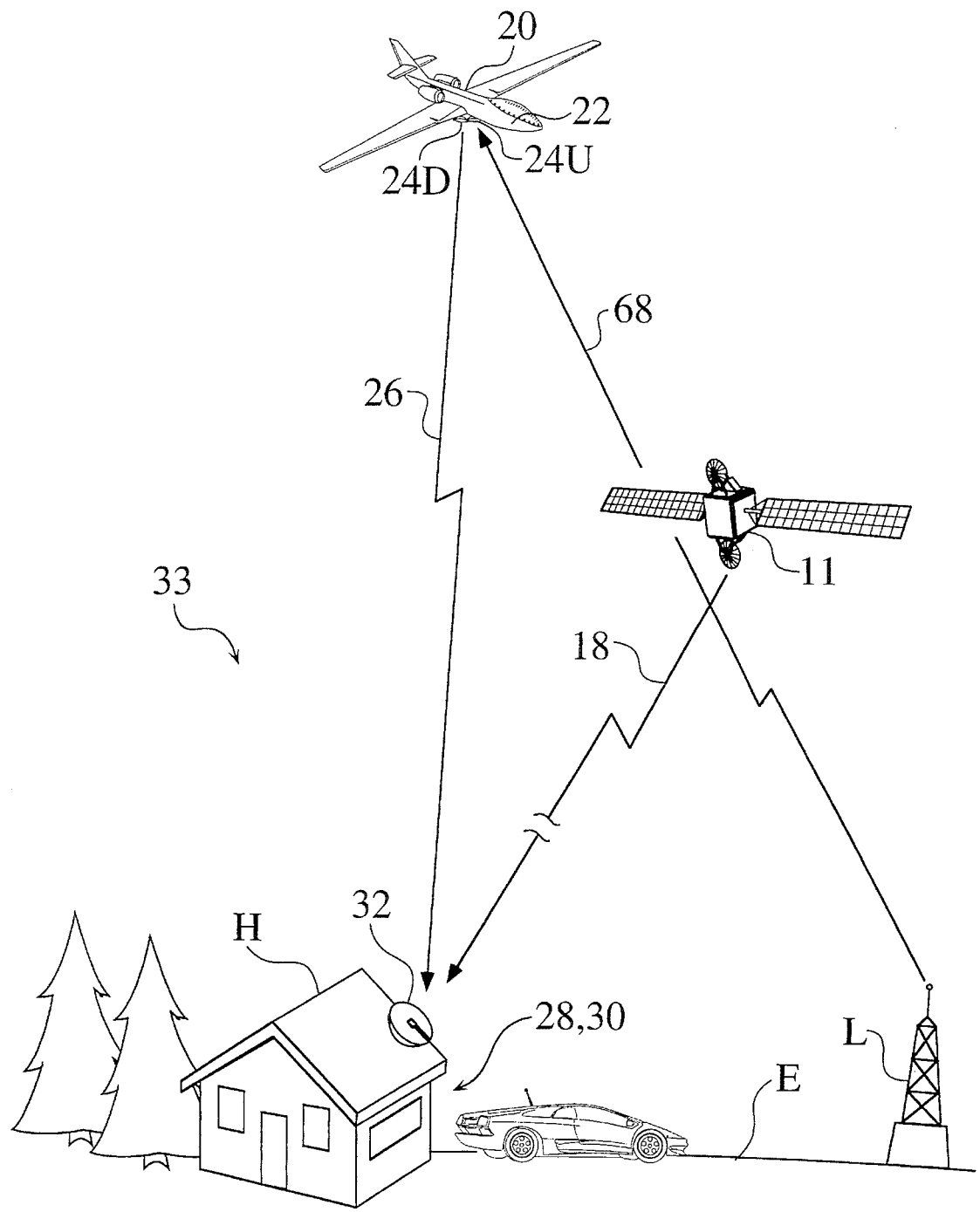
FIG. 3A is a schematic diagram which reveals the preferred embodiment of the present invention. The same receiving antenna shown in FIG. 2 is used to receive both direct satellite broadcasts and signals transmitted from a local airborne platform.

FIG. 3A is a third schematic view 33 that portrays a preferred embodiment of the present invention. An aircraft 20 flying over a home H is employed to rebroadcast local programming to a terminal 28 inside the home using the same receiver antenna 32 that is already utilized to acquire signals 18 from the satellite 11. In the preferred embodiment of the invention, the manned aircraft 20 includes a transponder 22 and antennas 24U and 24D which relay signals 26 to consumers.

Like all antennas, the paraboloidal reflector antenna 32 has a "main lobe" in which almost all of the radio-frequency energy received or sent by the antenna is contained. This main lobe 36 is generally from one to a few degrees in diameter, is approximately circular in cross-section and is on or near the central axis 34 of the reflector antenna 32.

As is also the case with all other antennas, the receiver antenna 32 has a series of unwanted responses, called "side lobes" These side lobes 38 are annular in cross-section, are centered roughly on the main lobe 36 and are separated from the main lobe 36 by angles that depend on the design of the antenna. There are several of these side lobes 38. In antennas used for receiving, the strongest response is in the side lobe nearest the main lobe (the "first side lobe"), and successively weaker responses occur in side lobes that are more widely separated from the main lobe. In a typical parabolic or paraboloidal-reflector antenna, the first side lobe is located at an angle to the main lobe of about four to six degrees, and its response is of the order of 20 to 30 decibels less than the main lobe.

Figure 3B:
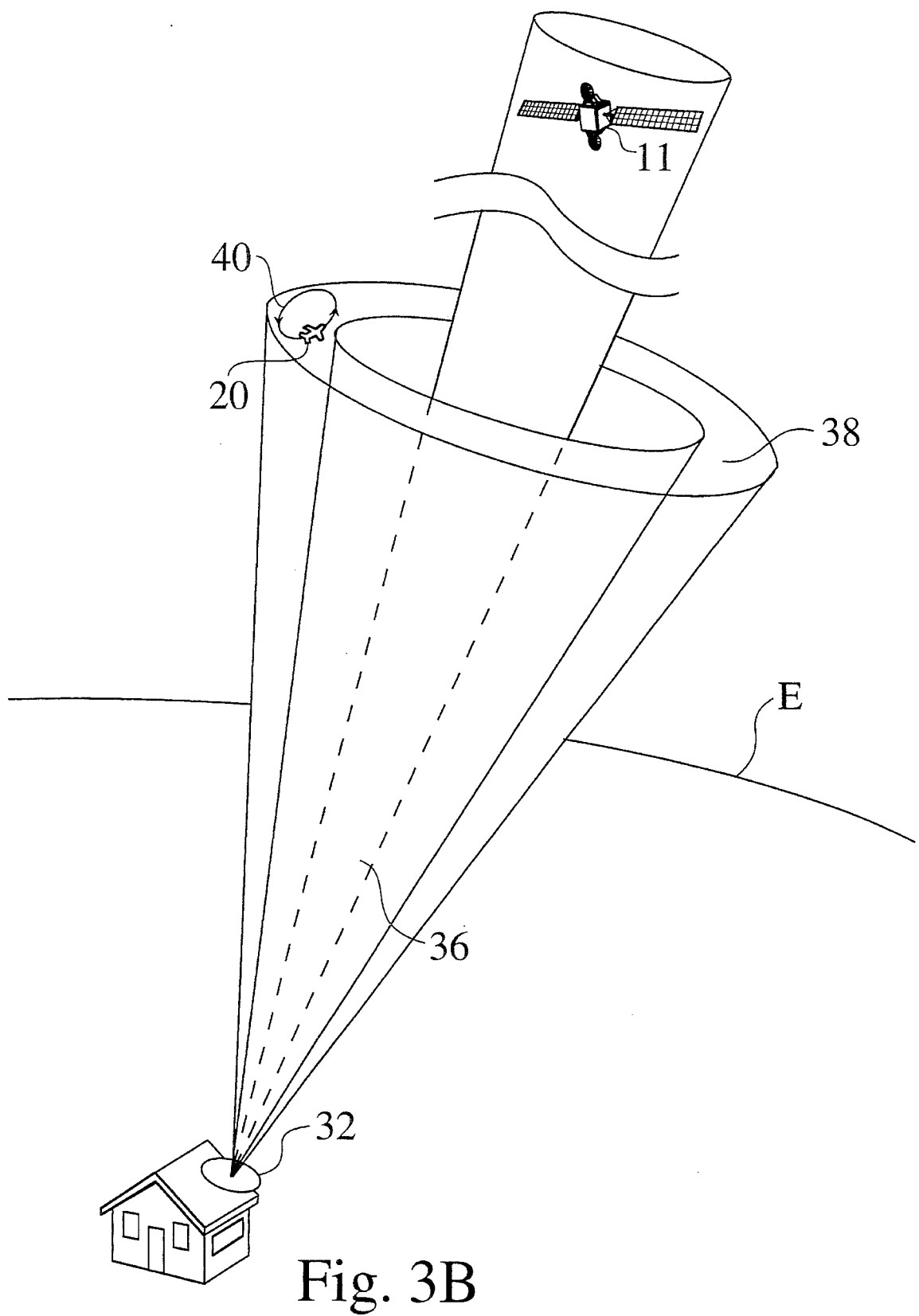
FIGS. 3B and 3C are schematic illustrations which show the relationships among the satellite, the airborne platform and receiving antennas. For the sake of simplicity of the drawing, the satellite and the airborne platform are displayed close together on the same page, even though they are actually located at vastly disparate altitudes. These two schematic figures are intended to reveal the basic geometry of the main and side lobes of receiving antennas as they relate to the airborne platform and the satellite.

FIG. 3B is a schematic drawing which shows a satellite 11 operating in a conical region of space that corresponds to the main lobe 36 of a receiving antenna 32. A rebroadcast signal 26 emitted by the aircraft is simultaneously sensed by the receiver antenna 32 using a side lobe, which is shown as a region of annular cross-section, labeled "38", coaxial to the main lobe 36. The response of the antenna to signals originating in the region of the annular cross-section between main lobe 36 and side lobe 38 is very slight. The aircraft 20 flies along a path 40 such as a circle or a closed loop within the region of annular cross-section that defines the side lobe 38. In the preferred embodiment, the path 40 is a "racetrack" pattern. The aircraft 20 is always positioned in the region of annular cross-section where the aircraft downlink antenna 24D can supply signals to the terminal 28 using the side lobe 38. The present invention may be implemented using any form of airborne platform 20, whether it is manned or unmanned.

Figure 3C:
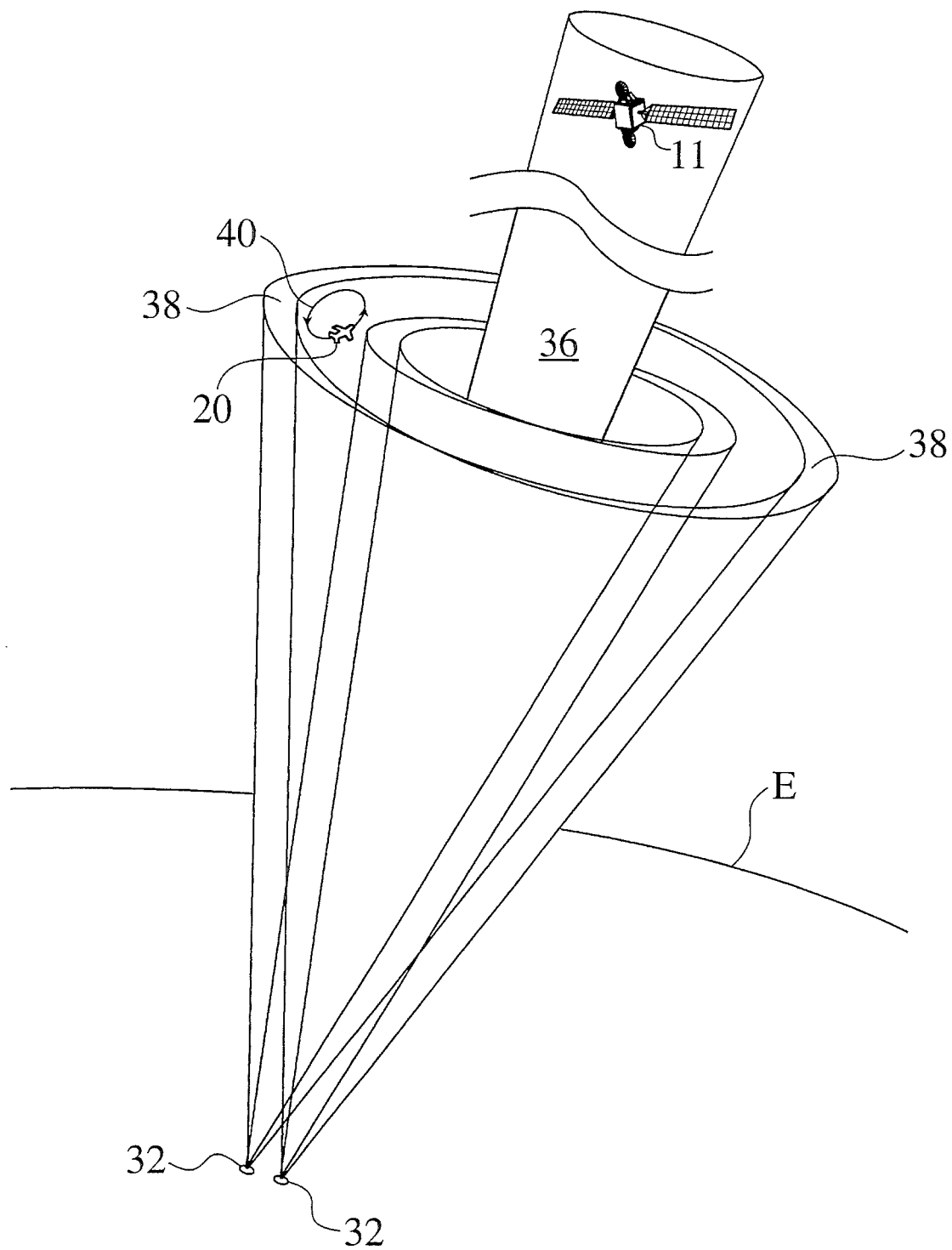

FIG. 3C is similar to FIG. 3B, but reveals how the aircraft 20 flies in an "overlap" region that occupies a zone which corresponds to the intersected spaces of the side lobes 38 of more than one receiving antenna 32. In the preferred embodiment of the invention, the airplane 20 is positioned over a densely populated area so that it can provide signals to many receiving antennas 32.

Figure 3D:
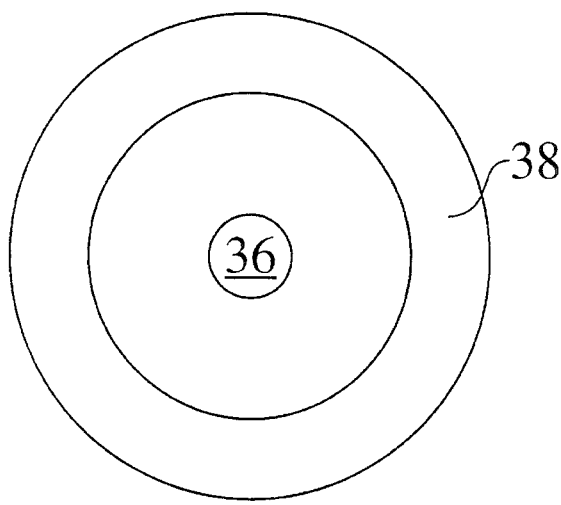
FIGS. 3D, 3E and 3F present cross-sections of the main and side lobes of a receiving antenna at the altitude of the airborne platform.
Figure 3E:
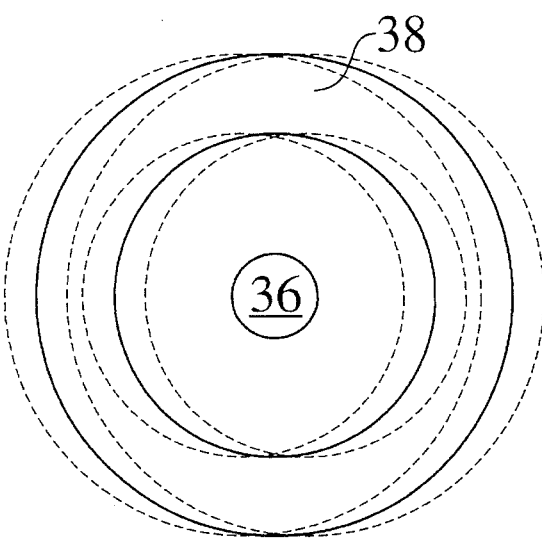
Figure 3F:
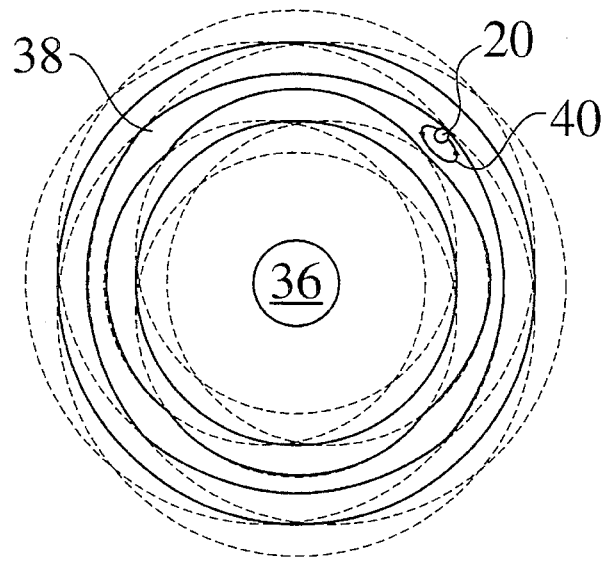

FIGS. 3D, 3E and 3F depict cross-sections of the main and side lobes 36 and 38 of the receiving antenna 32 at the altitude of the circling aircraft 20. FIG. 3D is a picture of a single antenna pattern. The circular cross-section of the main lobe 36 is situated at the center of this single antenna pattern, while the annular cross-section of the side lobe 38 is located at the periphery of the pattern.

FIG. 3E supplies an illustration of three superimposed overlapping antenna patterns like the single pattern shown in FIG. 3D. The two patterns shown in dashed lines in FIG. 3E are slightly offset from the center pattern along an East-to-West axis. FIG. 3F is similar to FIG. 3E, but adds two more antenna patterns that are offset from the center pattern along the North-to-South axis. FIGS. 3E and 3F are intended to demonstrate how the side lobes 38 of a number of receiving antennas 32 form an overlapping region or zone in the atmosphere. This overlapping region is the space where the aircraft 20 flies its closed loop pattern 40, as indicated in FIG. 3F.

Geometrical Relationships Among Satellites, Aircraft and the Receiver Antenna Since the geosynchronous satellites 11 are of necessity directly above the Equator, and all receiving antennas 32 of terminals 28 which are intended to receive signals from a geosynchronous satellite must point their main lobes 36 at the satellite 11, it follows that all antennas aimed at a geosynchronous satellite must point their main lobes 36 upward at an angle $\theta$ which depends on the latitude L of the antenna 32. The main lobes 36 must also be pointed sideward an angle to the local meridian determined by the position of the satellite in its Equatorial orbit, which position is regulated by Government authorities, and which must remain fixed with respect to the Earth's surface. The latitude $L(\theta)$ of a particular elevation angle ($\theta$) of the antenna is determined from the expression presented by Equation One:

$$L(\theta)=(\arccos(0.1510*\cos(\theta)))-\theta \qquad \text{Equation 1}$$

where $\theta$ is in degrees.

Figure 4:
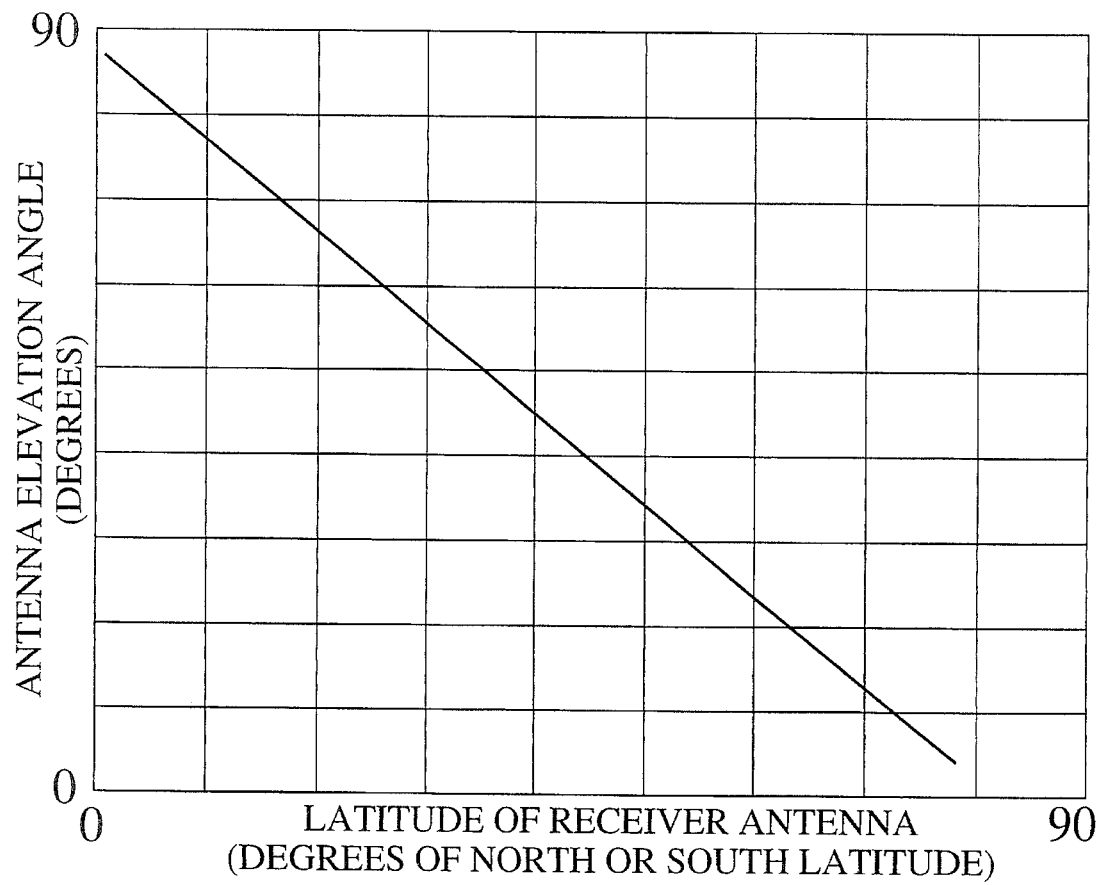
FIG. 4 is a graph which plots antenna elevation pointing angle versus the geographical latitude of the receiving antenna.

FIG. 4 presents a graph 42 which plots the antenna elevation pointing angle $\theta$ versus latitude $L(\theta)$.

The United States of America lies between approximately 24 degrees north latitude and 48 degrees north latitude, resulting in antenna elevation angles of about 36 degrees, in the north of Maine, to about 63 degrees in South Texas. The airplane 20 can be flown in an area that is sufficiently distant from metropolitan areas, and at an appropriate azimuth and elevation from the main beams of the receivers in that metropolitan area, to intersect the first side lobes 38 of most of the receiver antennas 32 in the metropolitan area. The minimum horizontal distance from the airplane 20 to the receiver antenna 32 is given by the expression:

$$D*h=a*\cot(\theta+\alpha) \qquad \text{Equation 2}$$

where a is the altitude of the airplane.

In a preferred embodiment of the invention, the airplane 20 flies at 50,000 feet above the surface, and its average horizontal distance from the receiving antennas 32 will range from 12 miles in Maine to 5.4 miles in south Texas. In this embodiment, the "top" of the first sidelobe 38 is utilized. The aircraft 20 may be flown in a region that is sufficiently distant from a metropolitan area, and at an appropriate azimuth from the main lobes 36 of the receiver antennas 32 in that metropolitan area, to intersect the first side lobes 38 of most of the receiving antennas 32 in the metropolitan area.

The free-space attenuation of the received signal is proportional to the square of the path length. The slant range to a geostationary satellite varies with latitude, but is generally about 24,000 miles. Even if the airplane is as far as fifty miles from a receiver, the received signal from the airplane is 10 log (25,000/50) =27 decibels stronger, other things being equal. This level of signal strength more than makes up for the lower sensitivity of the receiver antenna 32 at the side lobe angle.

Figure 5:
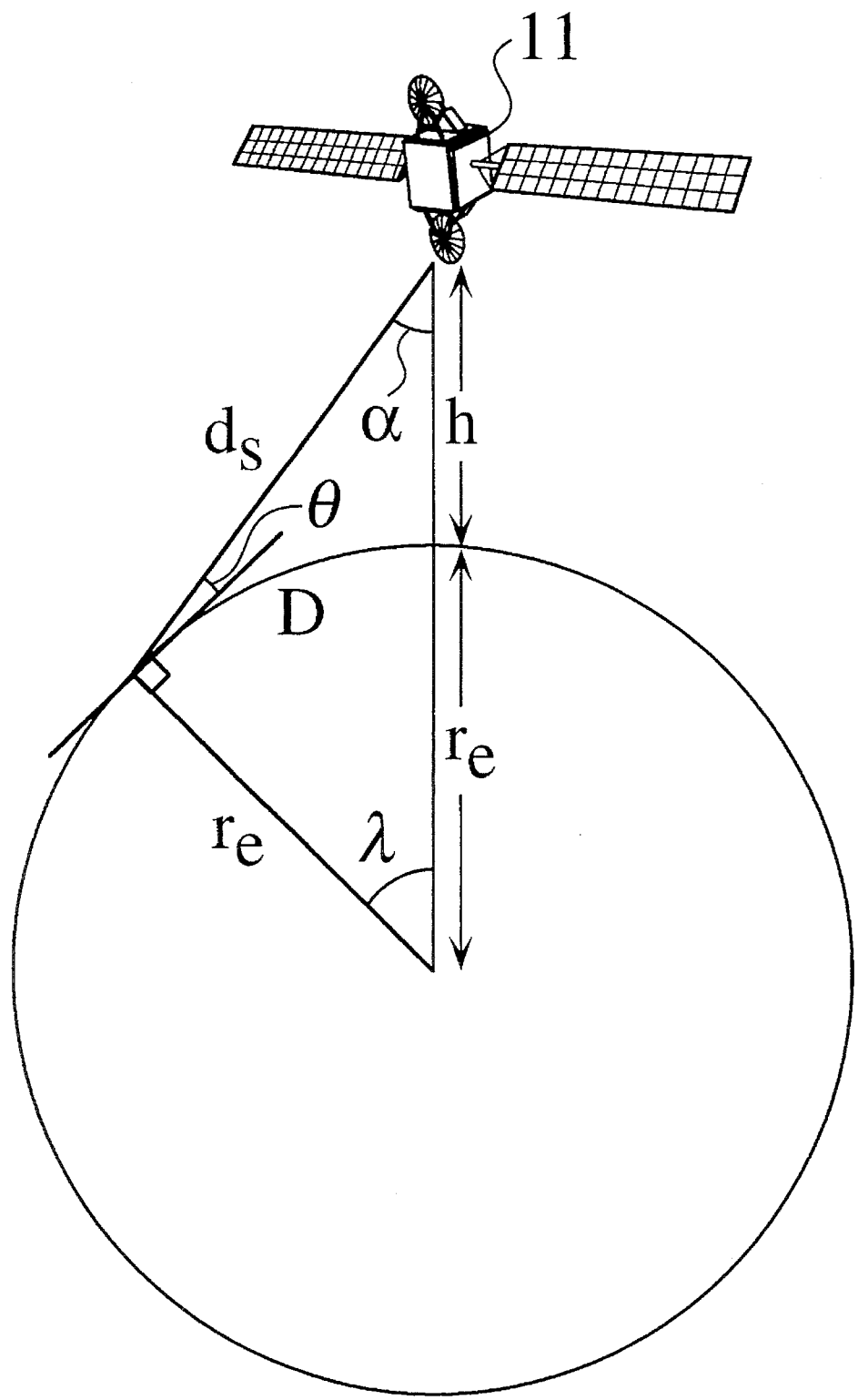
FIGS. 5 and 6 are schematic, unscaled drawings which depict geometrical relationships among a direct broadcast satellite, a local airborne platform and a receiving antenna on the Earth's surface.

FIG. 5 exhibits the geometrical relationships between a satellite 11 and a receiving antenna 32. The constants and variables depicted in FIG. 5 are specified below:

| | |
|---|---|
| $r_e$ = Earth's radius = | 6378 kilometers |
| h (geosynchronous) = | 35860 kilometers |
| $h_a$ = Airplane's altitude = | 50,000 feet (15.24 km) |
| $\beta$ = First sidelobe offset = | 4.5 degrees |
| $\delta$ = Beamwidth = | 3 degrees |
| $\alpha$ = Airplane's or satellite's lookdown angle | |
| $d_s$ = Slant range | |
| D = Surface distance from nadir | |
| $\lambda$ = Latitude difference | |
| $\theta$ = Look angle | |

For a geosynchronous satellite, the slant range $d_s$ and elevation (look angle) $\theta$ as seen from the subscriber's antenna varies with the subscriber's latitude as follows:

From the law of cosines:

$$d_s^2=r_a^2+(r_a+h)^2-2r_a(r_a+h)\cos\lambda \qquad \text{Equation 3}$$

From the law of sines:

$$\theta=\arccos(-(\sin\lambda)*(h+r_e)/d_s) \qquad \text{Equation 4}$$

For latitudes ranging from thirty to fifty degrees, Equation 4 produces the values presented in Table One:

TABLE One

| Latitude | 30 | 35 | 40 | 45 | 50 |
|---|---|---|---|---|---|
| $d_s$ | 36853 | 37194 | 37194 | 37576 | 37997 |
| $\theta$ | 55.00 | 49.4 | 43.7 | 38.2 | 32.7 |

Figure 6:
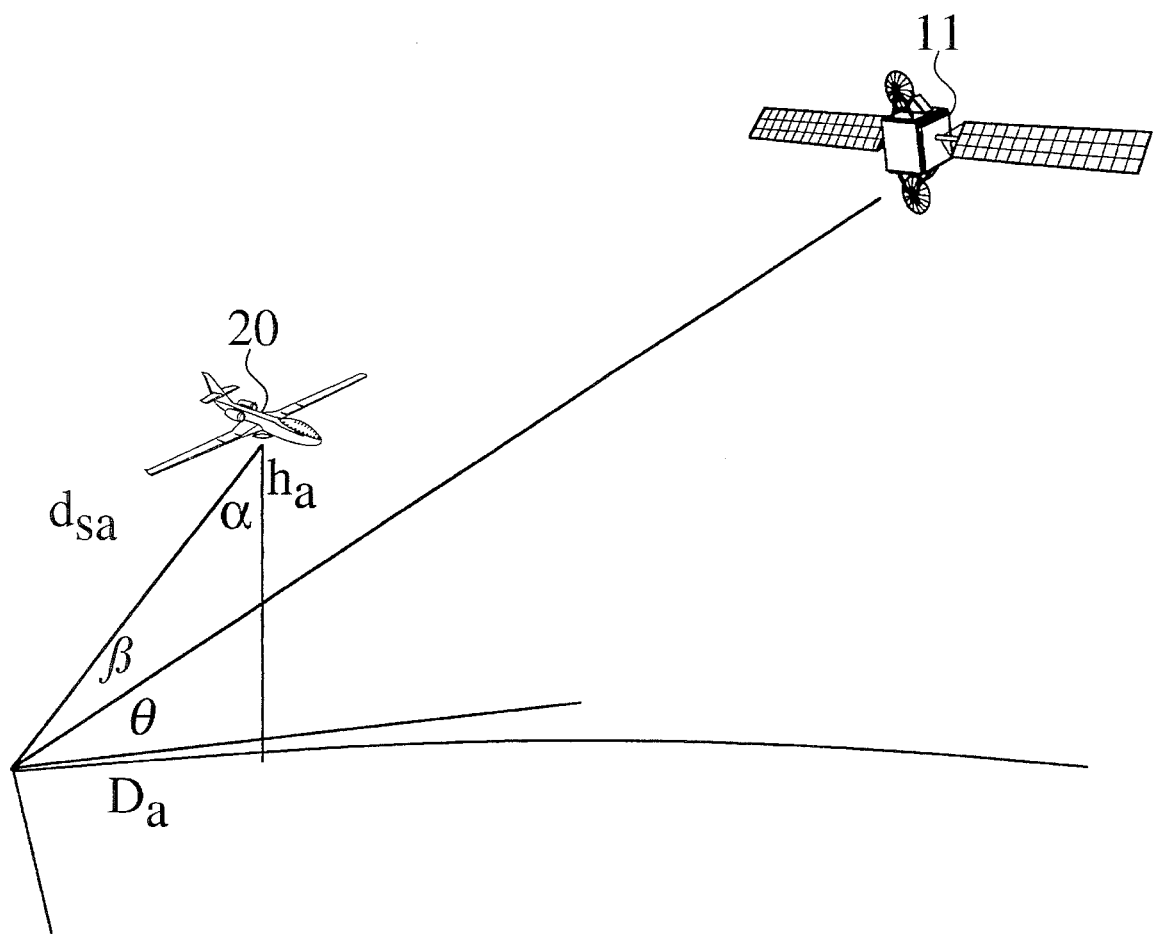

FIG. 6 depicts the geometrical relationships between the receiving antenna, the airplane and the satellite. For an airplane at an altitude $h_a$, the slant range $d_{sa}$ and the surface distance $D_a$ from the subscriber to the airplane may be calculated as follows:

$$\alpha=\arcsin(r_e*\sin(b+\theta+90)/(h_a+r_e)) \qquad \text{Equation 5}$$

$$\lambda=180-(\alpha+\beta+\theta+90) \qquad \text{Equation 6}$$

$$D_a=\pi*r_e*\lambda/180, \text{ approximately } h_a/\tan(\theta+\beta) \qquad \text{Equation 7}$$

Table Two presents the appropriate values of $\alpha$, $\lambda$, $d_{sa}$ and $D_a$ for the case when the airplane 20 is centered in the top of the first side lobe 38:

TABLE Two

| $\alpha$ degrees | 30.4 | 36.0 | 41.6 | 47.2 | 52.6 |
|---|---|---|---|---|---|
| $\lambda$ degrees | 0.08 | 0.10 | 0.12 | 0.15 | 0.18 |

TABLE Two-continued

| $d_{sa}$ kilometers | 17.7 | 18.9 | 20.4 | 22.4 | 25.2 |
|---|---|---|---|---|---|
| $D_a$ kilometers | 9.0 | 11.1 | 13.6 | 16.5 | 20.1 |

Figure 7:
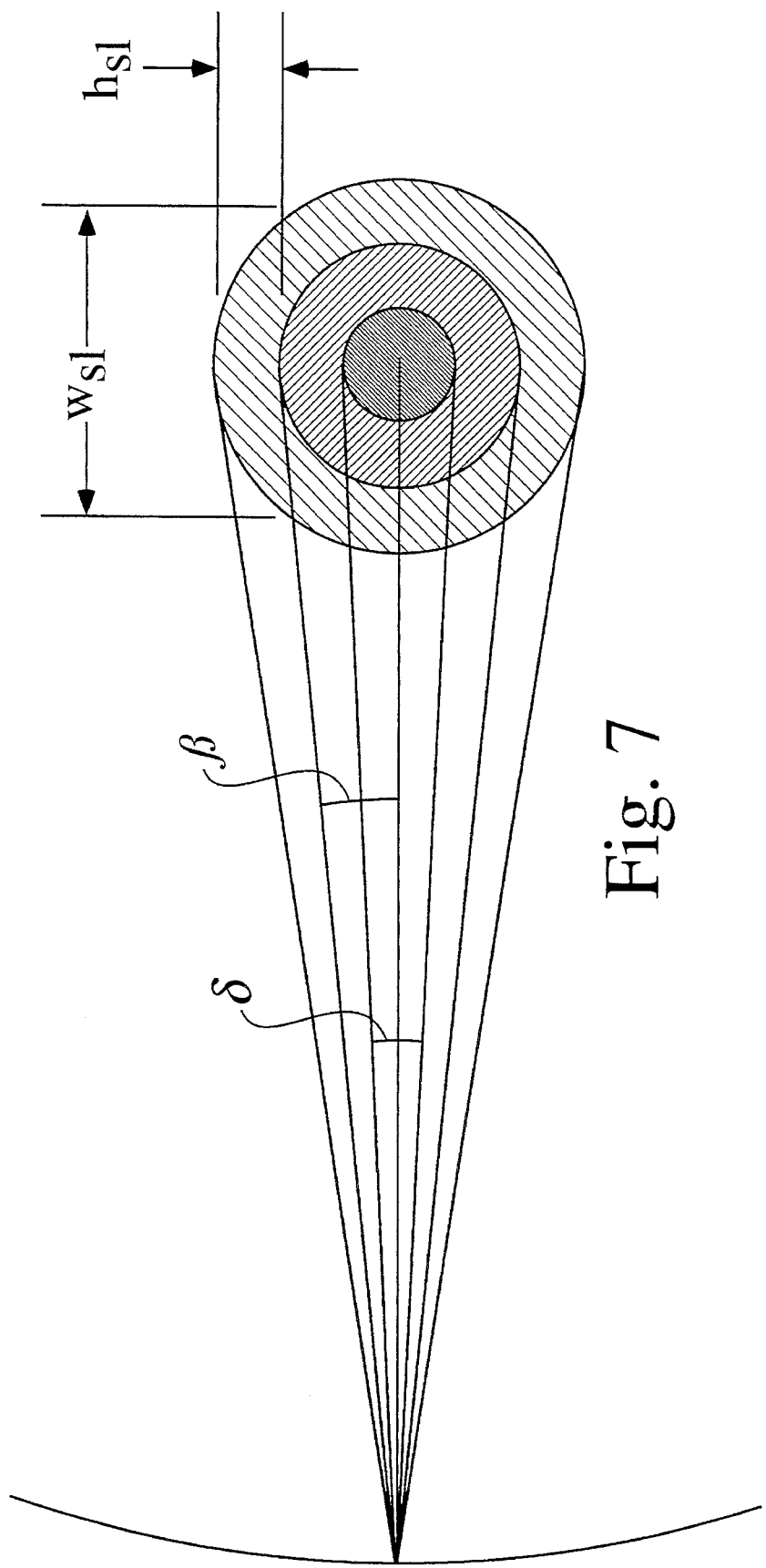
FIG. 7 supplies a view of a receiving antenna pattern, and includes a depiction of both the main and side lobes of the antenna.

Equations 8 and 9 are utilized to determine if the first side lobe 38 is large enough at the airplane's slant range so that the airplane can maneuver, and to ensure that the first side lobes 38 of receiving antennas 32 situated across a city can "see" the airplane. The height $h_{si}$ and width $W_{sh}$ of the first side lobe are illustrated in FIG. 7. The height $h_{si}$ and width $W_{sh}$ of the first side lobe at a distance $d_{sa}$ are given by:

$$h_{si}=d_s*\tan(\delta) \qquad \text{Equation 8}$$

$$w_{si}=2*\sqrt{(2h_{si}*d_{sa}-h_{si}^2)} \qquad \text{Equation 9}$$

The values for $h_{si}$ and $w_{si}$ are shown in Table Three:

TABLE Three

| $h_{si}$ kilometers | 0.9 | 1.0 | 1.1 | 1.2 | 1.3 |
|---|---|---|---|---|---|
| $w_{si}$ kilometers | 11.3 | 12.1 | 13.0 | 14.3 | 16.1 |

Figure 8A:
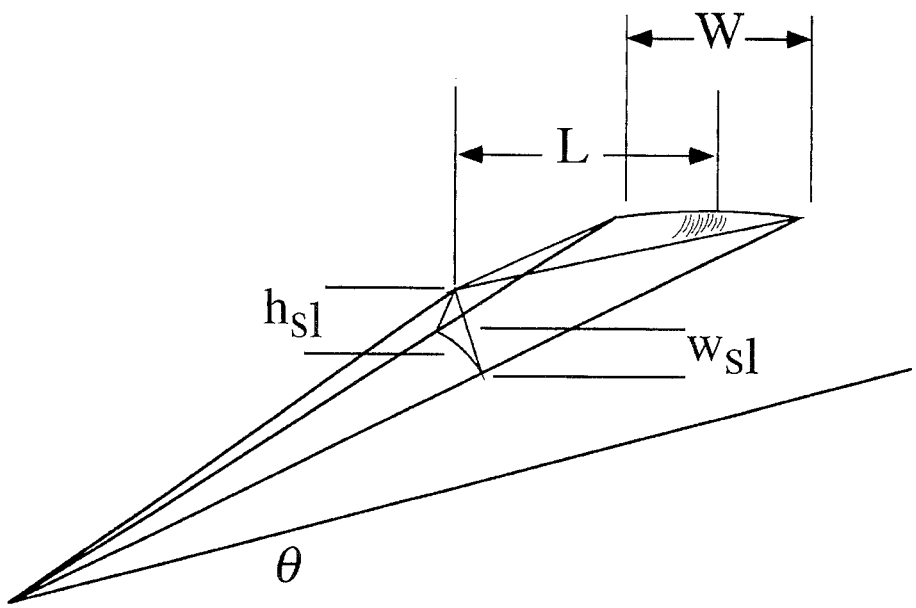
FIGS. 8A and 8B illustrate the geometry of the projection of the upper portion of the side lobe which lies in the plane of the altitude of the airborne platform.
Figure 8B:
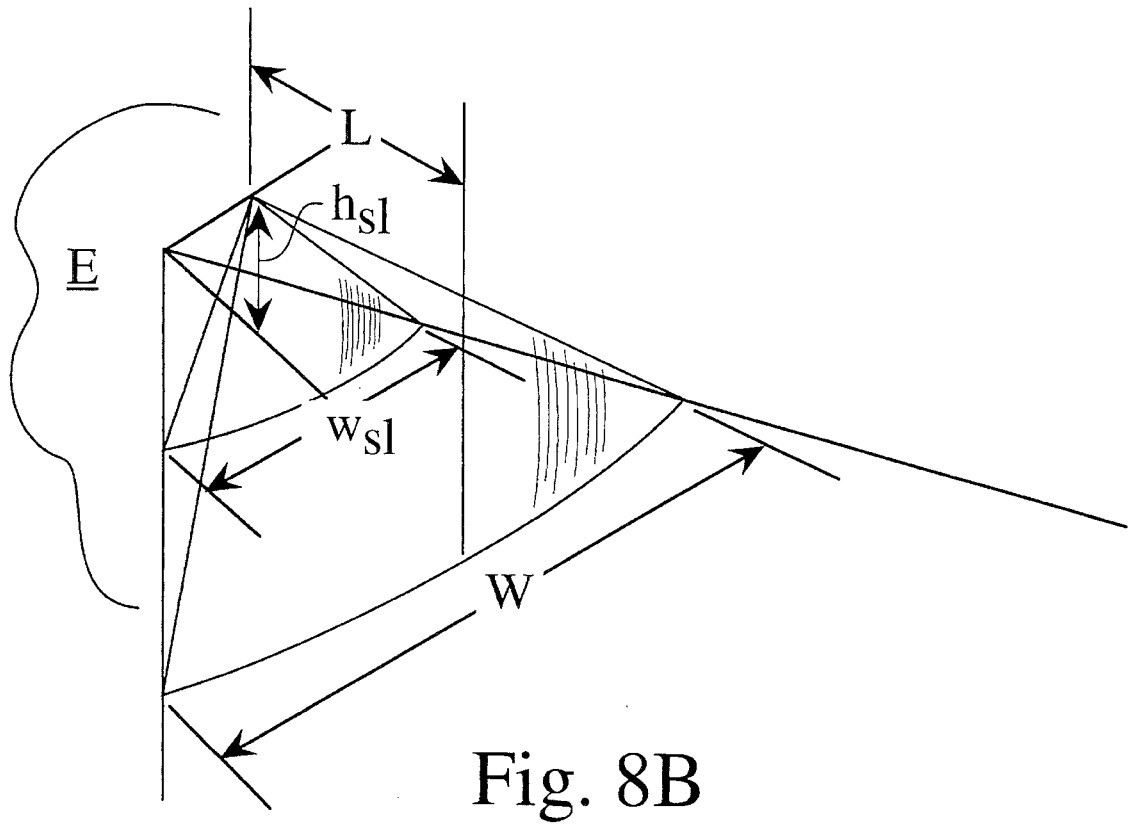

FIGS. 8A and 8B illustrate the geometry of the projection of the receiving antenna side lobe 38 at the position of the airplane 20. The length and width of the area "seen" by the first sidelobe at the airplane's altitude must be calculated to determine whether the airplane 20 can stay within the sidelobe 38. The length ⌐ of the projection of the sidelobe on the plane of the airplane's altitude is:

$$⌐=(h_a/\sin(\theta+\beta-(\delta/2)))-(h_a/\sin(\theta+\beta+(\delta/2))) \qquad \text{Equation 10}$$

and the width is:

$$W=w_{si}*h_a/\sin(\theta+\beta-(\delta/2))/d_{si} \qquad \text{Equation 11}$$

Equations 10 and 11 may be used to generate the values contained in Table Four:

TABLE Four

| £ kilometers | 0.5 | 0.7 | 1.0 | 1.3 | 1.7 |
|---|---|---|---|---|---|
| W kilometers | 15.5 | 17.8 | 21.1 | 26.0 | 34.3 |

If the city being served has a radius of $R_c$, the first sidelobes of subscribers at the edges of the city will be displaced from the center of the average volume "seen" by all sidelobes by the amount of their distance from the center of the city. The slight difference in pointing angle toward the very distant geosynchronous satellite 11 is negligible (a maximum of 0.0066 degrees at the altitudes considered here). This will constrain the airplane 20 to fly a rather tight racetrack pattern 40 to stay in the optimum serving area. The best position for the airplane 20 is as high as possible, and if the city is not circular but linear in shape (as is the case for many cities, especially coastal cities), the long axis of the racetrack pattern 40 should be on a line perpendicular to the long axis of the city. The turning radius of an airplane is determined by its speed and its angle of bank. A maximum angle of bank is about 60 degrees; this is a "two-gravity" turn, which results in a 360 degree turn in one minute. The speed of the airplane is ideally its maximum-endurance speed, about 1.2 times its stalling speed. Stalling speed, in turn, varies with weight, and decreases as fuel is burned. Stalling speed also varies considerably with the density of the air, which is a function of altitude and temperature.

The temperature in the stratosphere is relatively constant at −55 degrees Celsius. A "Standard Atmosphere" temperature of $T_a$=217 degrees Kelvin and a sea-level stalling speed $V_s$ of 50 knots (92.6 km/hr) are employed to determine the turning radius. Because of Government Air Traffic Control regulations, the airplane will fly at a constant pressure altitude regardless of its geometric altitude; the density altitude is thus a function only of temperature. The Standard Atmosphere uses a seal-level temperature of 15 degrees Celsius. Other values that are utilized to calculate the turning radius are presented in Table Five.

TABLE Five

| Rate of turn, degrees/second | $T_R =$ | 6 degrees/second |
|---|---|---|
| Air temperature at $h_a$, degrees Kelvin | $T_a =$ | 217 degrees Kelvin |
| Sea-level stalling speed in cruising configuration | $V_s =$ | 50 knots |
| Density altitude = $h_d$ = $h_a * Ta/288.15$; | $h_d =$ | 37654 feet |
| Sea level loitering speed is 1.2 * $V_s$ | $V_L =$ | 60.0 knots |
| Aircraft recovery coefficient is assumed to be 0.8 | $C_T =$ | 0.8 |

The true airspeed (TAS) is calculated in steps, as follows:

$$\text{Pressure ratio}=R_p=(((518.67-3.566*10^{-3}*h_a)/518.56))^{5.2563}$$

$$R_p=0.109248$$

$$\text{Mach number}=M=\{(5*((1/R_p)*((1+0.2(V_L/661.5)^2)^{3.5}-1)+1)^{0.2857}-1)\}^{1/2}$$

$$M=0.272168$$

$$V_{Lha}=38.96*M*\sqrt{(T_a*(C_T((1/(1+0.2*M^2))-1)+1))}$$

$$V_{Lha}=155.3$$

The turning radius is, therefore:

$$(V_{Lha}*180/T_R)/(2*60*60*\pi)=R_T=0.21 \text{ Nmi., or } 0.38 \text{ kilometers}$$

which is adequate for the objectives of the preferred embodiment, since it is within the service volume specified above.

Satellites Utilized in the Preferred Embodiment

Figure 9A:
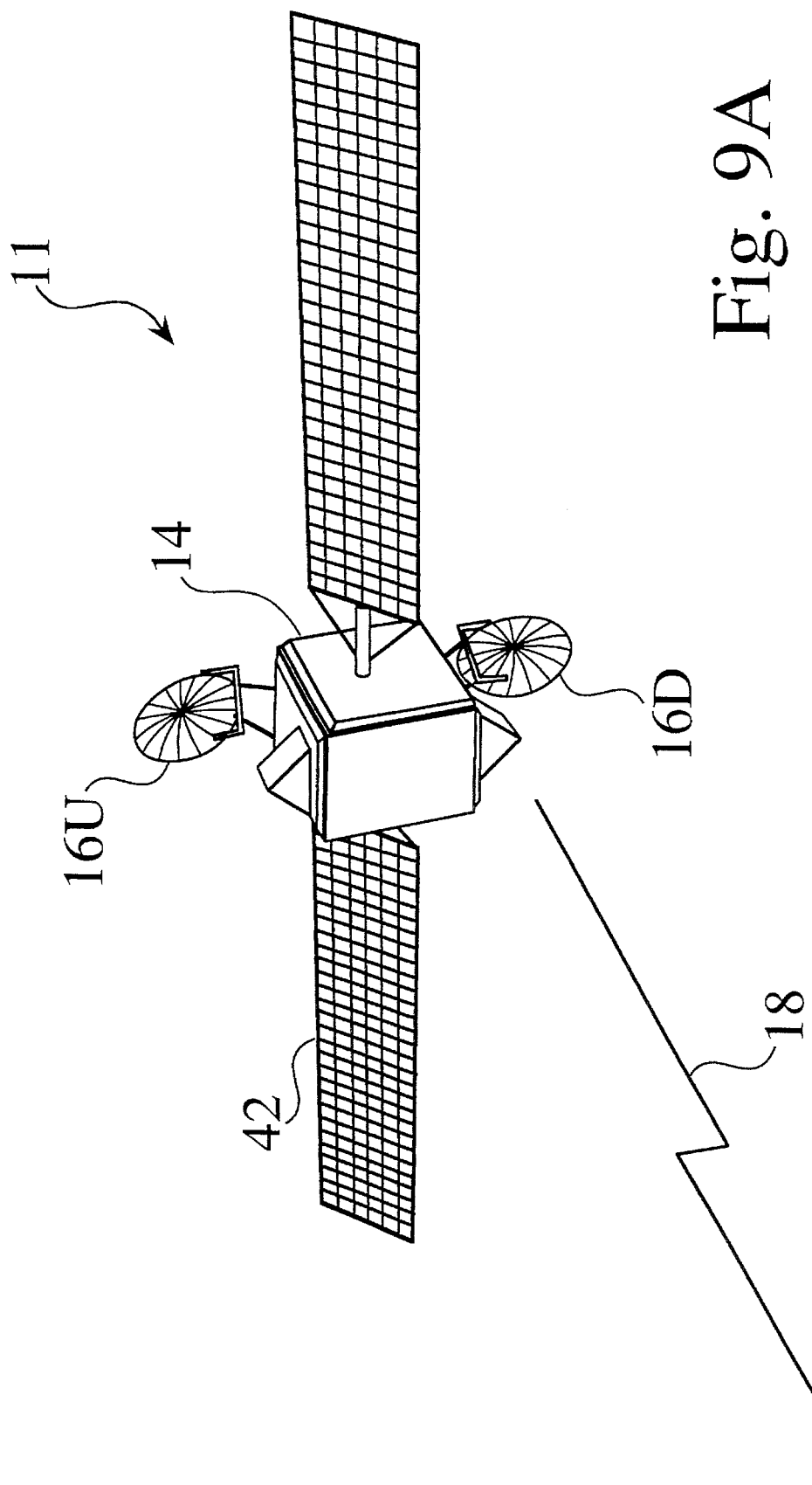
FIG. 9A is a schematic view of a satellite that may be employed to practice the present invention.

FIG. 9A is a schematic illustration of a geosynchronous satellite 11 that may be used to implement the present invention. The satellite includes a transponder 14 and antennas 16D and 16U.

Figure 9B:
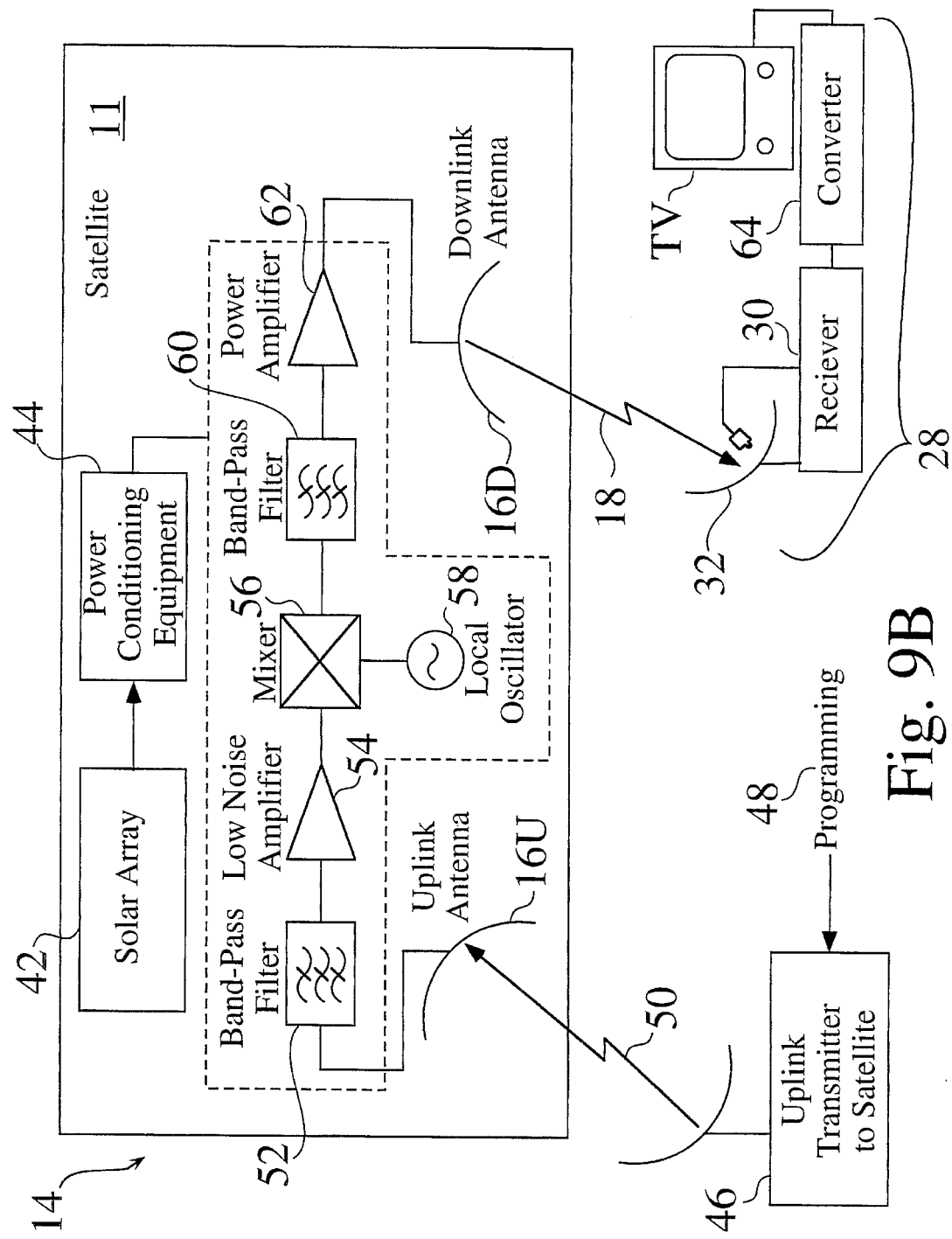
FIG. 9B presents a schematic block diagram of a satellite-borne television transponder.

FIG. 9B offers a schematic block diagram of a satellite-borne television transponder 14. Solar arrays 42 generate electrical power which is fed to power conditioning equipment 44. A terrestrial uplink transmitter 46 feeds video programming 48 to a satellite uplink antenna 16U via uplink transmitter beams 50. Signals from the uplink antenna 16U are processed by a band-pass filter 52, a low noise amplifier 54 and a mixer 56 which is also connected to a local oscillator 58. A second band-pass filter 60 conveys signals from the mixer 56 to a power amplifier 62 and then to a downlink antenna 16D. Satellite beams 18 are collected by receiving antenna 32 and are then processed by receiver 30 and converter 64 before they are finally passed to a television TV.

Aircraft Utilized in the Preferred Embodiment

Figure 10A:
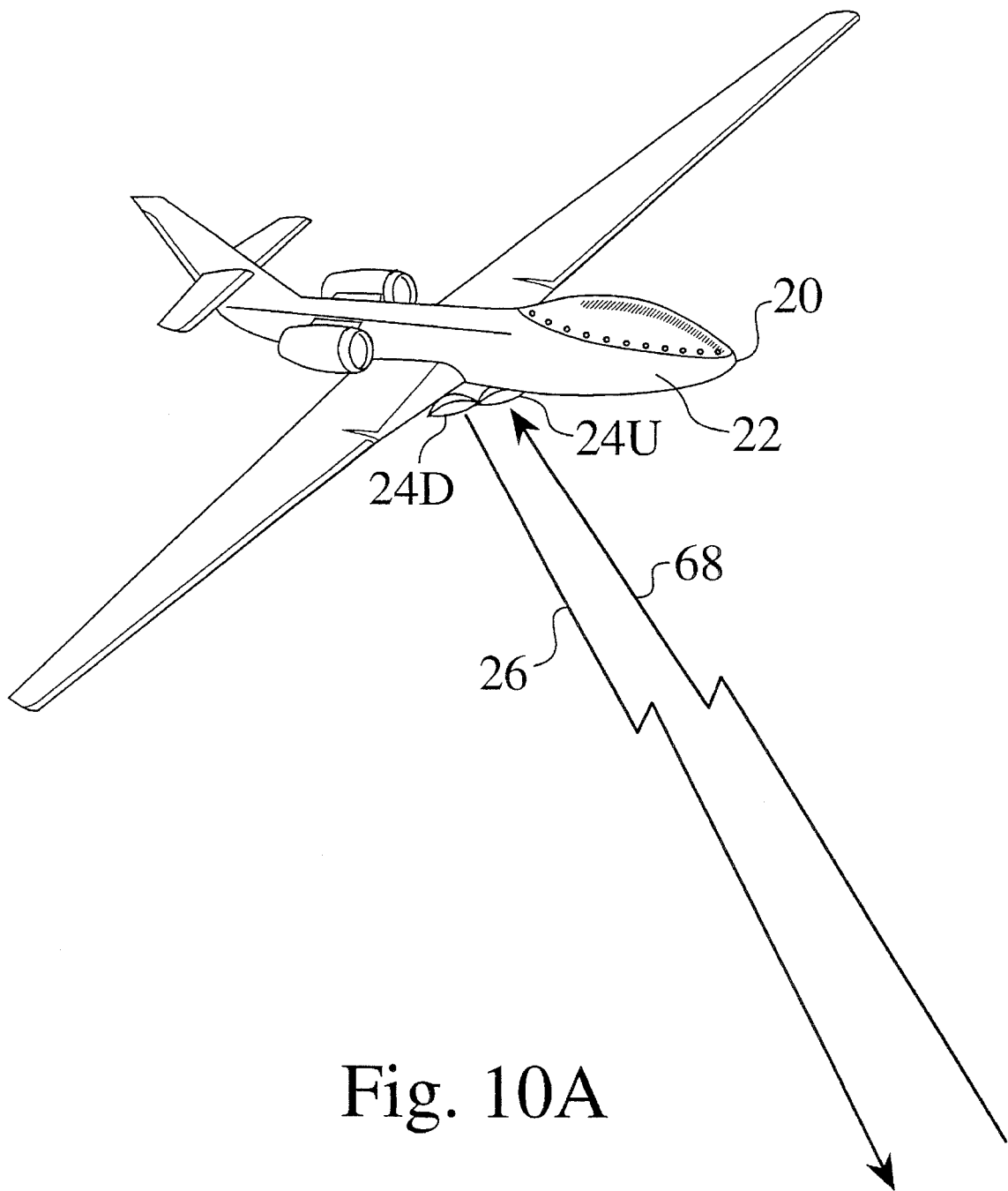
FIG. 10A is a schematic view of an aircraft that may be utilized to implement the present invention.
Figure 10B:
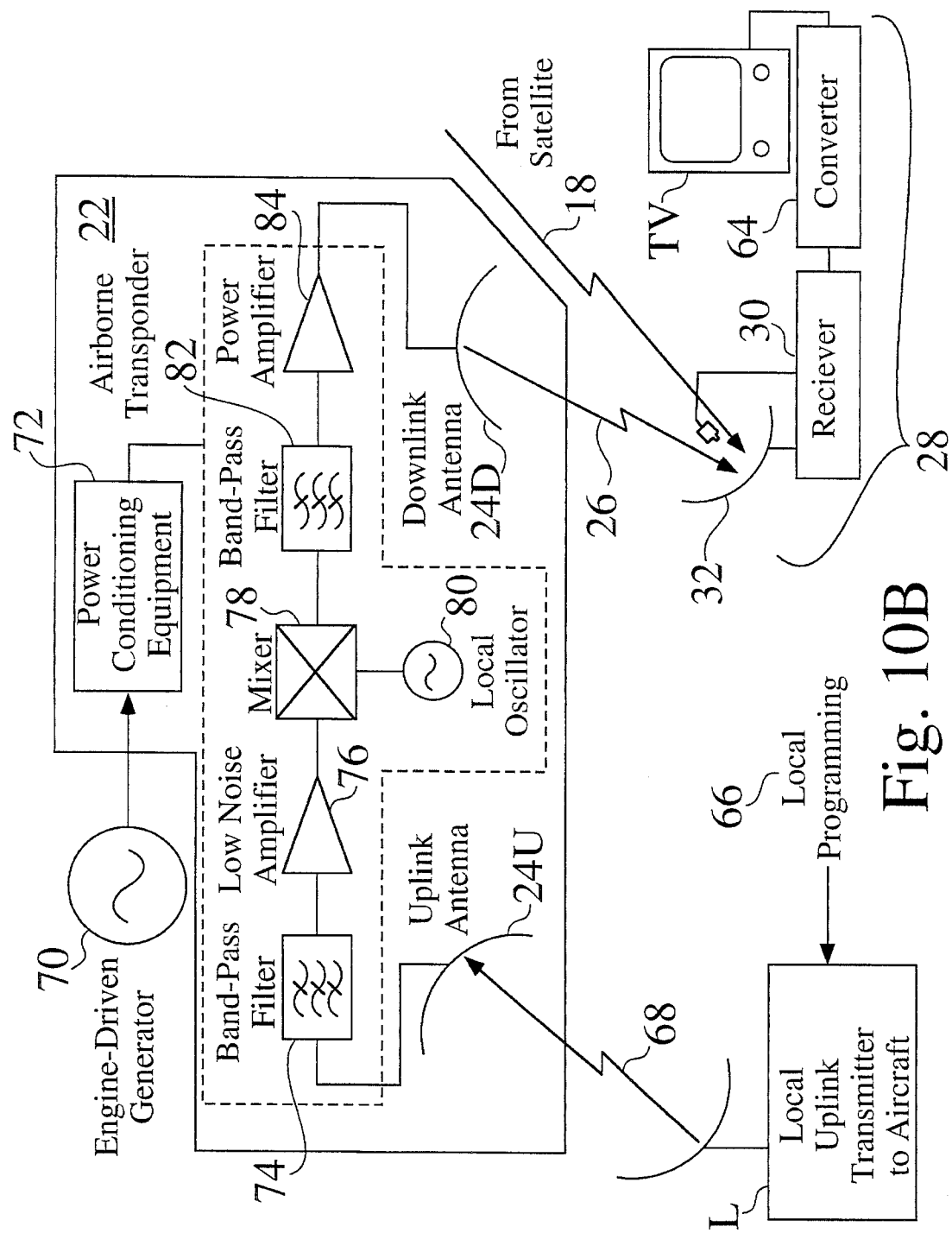
FIG. 10B is a schematic block diagram of an aircraft-borne television transponder.

FIG. 10A presents a schematic view of an aircraft 20 that may be used to practice the preferred embodiment of the present invention. The airplane 20 includes a transponder 22 and uplink and downlink antennas 24U and 24D that relay signals from a local ground transmitter L to home receiving antennas 32. The details of the aircraft-borne transponder 22 are revealed in FIG. 10B. Local video programming 66 is relayed to an aircraft uplink antenna 24U via a local uplink transmitter L which emits uplink transmitter beams 68. A generator 70, which may be driven by the aircraft's engine, furnishes electrical power to power conditioning equipment 72 aboard the airplane 20. Signals from the uplink antenna 24U are delivered to a band-pass filter 74, a low noise amplifier 76 and a mixer 78 that is linked to a local oscillator 80. The output of the mixer 78 is fed to a second band-pass filter 82 and a power amplifier 84 which, in turn, forwards signals to an airborne downlink antenna 24D. Beams 26 from the airplane 20 are sensed by receiving antenna 32, which is coupled to receiver 30, converter 64 and television TV.

Figure 11:
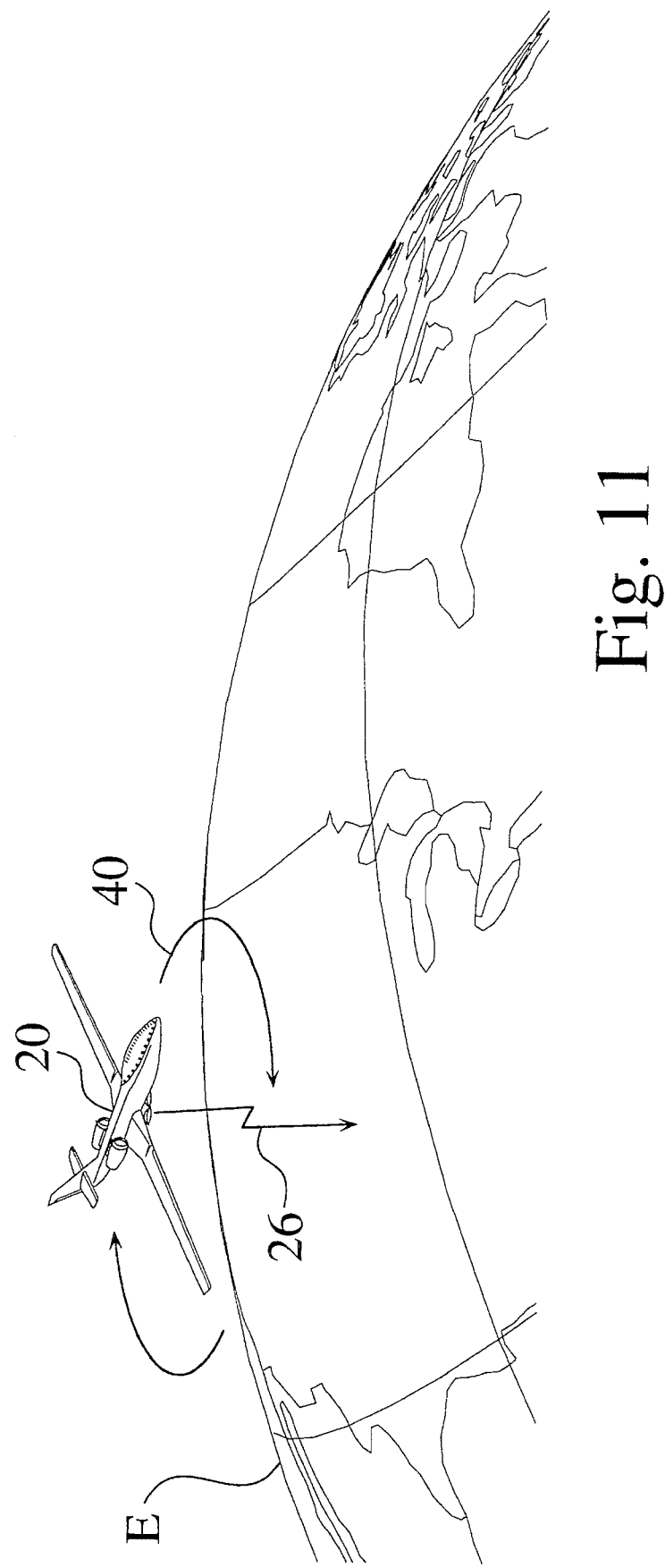
FIG. 11 shows the aircraft depicted in FIG. 10 flying in a generally circular flight path.

FIG. 11 shows the airplane 20 flying in a generally closed loop pattern 40. Although the preferred embodiment of the invention is implemented using a manned airplane, alternative embodiments of the invention may be practiced using a blimp, a dirigible, a helicopter, both free and untethered balloons, aerostats or any other airborne platform that will serve as a reliable source for providing signals to receiver antennas 32.

Home Receiving Antennas

Figure 12:
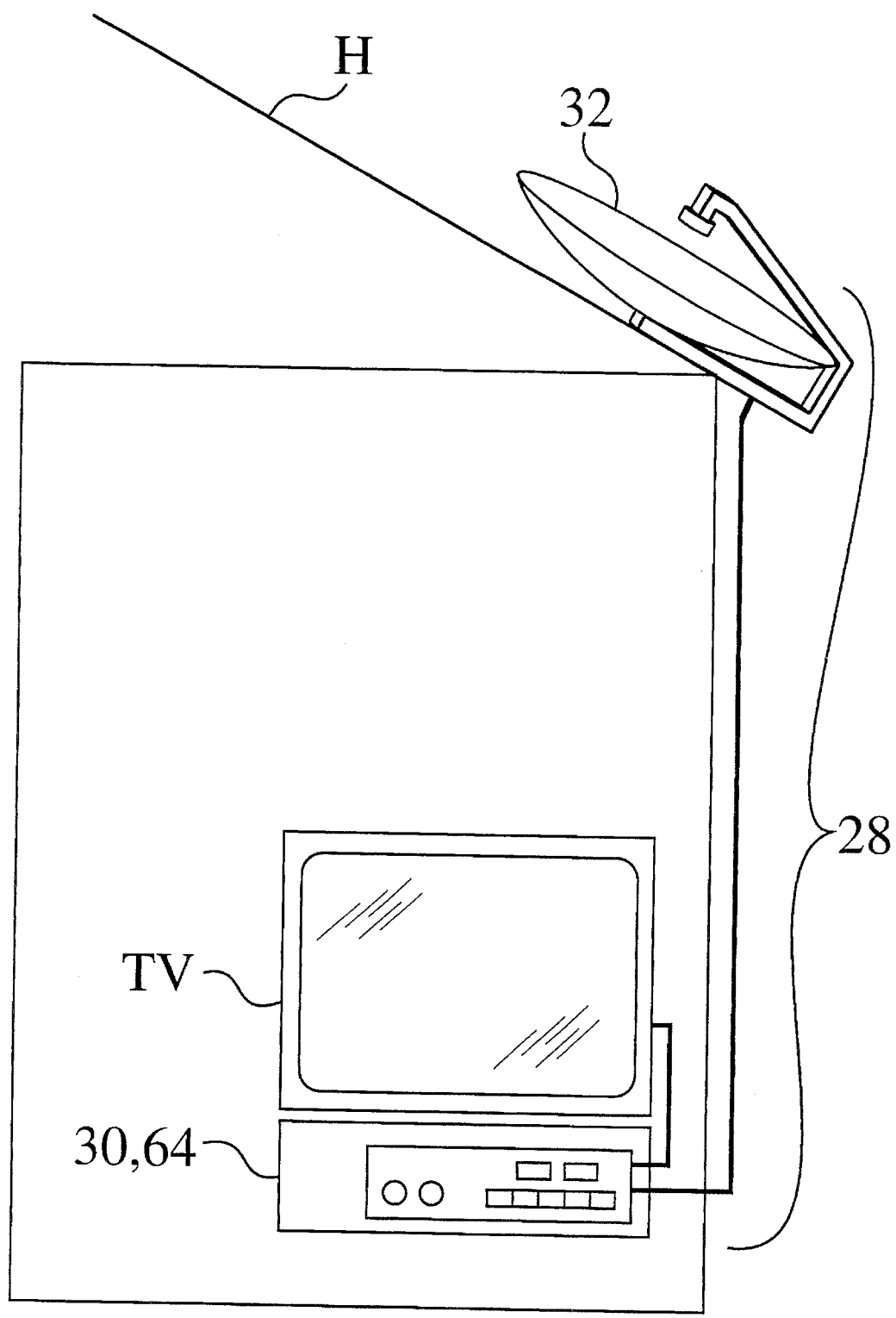
FIG. 12 is a schematic view of a direct broadcast satellite terminal, which includes a receiver and an antenna.
Figure 13:
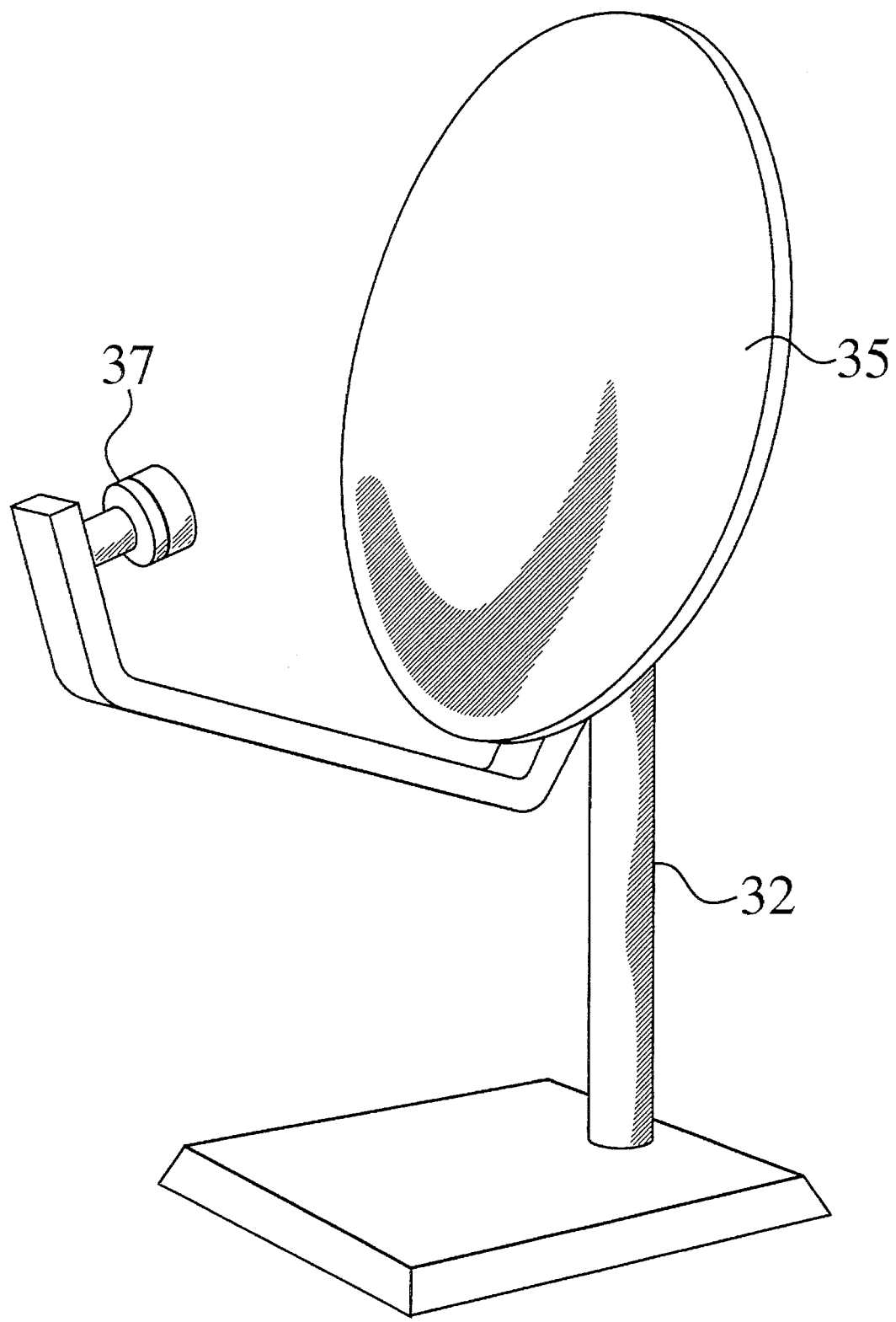
FIG. 13 is a perspective view of a receiving antenna.

FIG. 12 illustrates a receiving antenna 32 mounted on the rooftop of a home H. A terminal 28 includes a direct broadcast receiver 30 connected to the antenna 32, a converter 64 and a television TV. FIG. 13 offers a perspective view of a receiving antenna 32.

Various methods may be employed to deliberately enhance the gain of the side lobe 38 of the receiving antenna 32. In a conventional paraboloidal reflector, the antenna surface 35 is carefully contoured to approximate shape of a true paraboloid to maximize the gain of the main lobe 36. In one embodiment of the invention, the antenna surface 35 may be deliberately distorted to augment the gain of the side lobe 38. Another technique which strengthens the sensitivity of the side lobe 38 is to decrease the taper of the radiation emitted by the feedhorn structure 37 so that it illuminates the edges of the reflector 32 more strongly. Another alternative that exaggerates the action of the side lobe 38 is to reduce the size of the receiver antenna 32, or to reduce the radius of the antenna 32 in the direction in which the side lobe 38 is to be enhanced. The side lobe 38 may also be effectively boosted by distorting the shape of the energy radiated from the feedhorn structure 37 so that the reflector 32 is illuminated more strongly in an off-axis direction.

Yet another method of improving side lobe 38 sensitivity is to move the feedhorn structure 37 slightly closer to the reflector relative to its normal position. This alteration defocuses the beam slightly, and makes the first side lobe 38 stronger and the main lobe 36 very slightly weaker. Another alternative method involves forming a small dimple in the feedhorn structure 37 or a by making a small dent in the reflector 32.

The present invention may also be implemented using a receiving antenna 32 which is specially built to have an adjustable shaped beam that is specifically suited to detect signals from the airplane 20.

The present invention exploits an inherent weakness in receiving antennas, and also exploits the fact that antennas manufactured at the time this Patent Application is being filed which are used to receive broadcasts from geosynchronous broadcast satellites using newly-occupied $K_u$-band (about 14 GHz) are of identical design.

CONCLUSION

Although the present invention has been described in detail with reference to particular preferred and alternative embodiments, persons possessing ordinary skill in the art to which this invention pertains will appreciate that various modifications and enhancements may be made without departing from the spirit and scope of the claims that follow. The various orbital parameters, satellites, aircraft and receiving antennas that have been disclosed above are intended to educate the reader about particular embodiments, and are not intended to constrain the limits of the invention or the scope of the claims. The *List of Reference Characters* which follows is intended to provide the reader with a convenient means of identifying elements of the invention in the specification and drawings. This list is not intended to delineate or narrow the scope of the claims.

| LIST OF REFERENCE CHARACTERS | |
|---|---|
| 10 | Schematic diagram of geosynchronous satellites in Earth orbit |
| 11 | Satellites |
| 12 | Earth orbit |
| 13 | Schematic diagram showing direct satellite broadcast to home |
| 14 | Satellite transponder |
| 16D | Satellite downlink antenna |
| 16U | Satellite uplink antenna |
| 18 | Satellite beams of radiation |
| 20 | Airborne platform |
| 22 | Airborne platform transponder |
| 24D | Airborne platform downlink antenna |
| 24U | Airborne platform uplink antenna |
| 26 | Airborne platform beams of radiation |
| 28 | Terminal |
| 30 | Receiver |
| 32 | Receiver antenna |
| 33 | Schematic diagram showing preferred embodiment of present invention |
| 34 | Central axis of antenna |
| 35 | Surface of receiver antenna |
| 36 | Main antenna lobe |
| 37 | Feedhorn structure |
| 38 | Side antenna lobe |
| 40 | Flight path |
| 42 | Solar array |
| 44 | Power conditioning equipment |
| 46 | Uplink transmitter |
| 48 | Video programming |
| 50 | Uplink transmitter beams |
| 52 | Band-pass filter |
| 54 | Low noise amplifier |
| 56 | Mixer |
| 58 | Local oscillator |
| 60 | Band-pass filter |
| 62 | Power amplifier |
| 64 | Converter |
| 66 | Local video programming |
| 68 | Local uplink transmitter beams |
| 70 | Engine-driven generator |
| 72 | Power conditioning equipment |
| 74 | Band-pass filter |
| 76 | Low noise amplifier |
| 78 | Mixer |
| 80 | Local oscillator |
| 82 | Band-pass filter |
| 84 | Power amplifier |
| E | Earth |
| F | Footprint |
| H | Home |
| L | Local ground television transmitter |

What is claimed is:

1. A communications apparatus comprising:

a satellite (11) in Earth orbit (12); said satellite (11) including a satellite transponder (14) and a satellite antenna (16) for conveying a set of satellite beams of radiation (18) toward the surface of the Earth (E);

an airborne platform (20); said airborne platform (20) including an airborne platform transponder (22) and an airborne platform antenna (24D, 24U) for conveying a set of airborne platform beams of radiation (26) toward the surface of the Earth (E); and a terminal (28); said terminal (28) including a receiver (30) and a receiver antenna (32);

said receiver antenna (32) having a central axis (34) and a main antenna lobe (36); said main antenna lobe (36) being generally coaxial with said central axis (34); said main antenna lobe (36) being pointed toward said satellite (11) and being used to receive said set of satellite beams of radiation (18);

said receiver antenna (32) also having an antenna surface (35) and a feed structure (37);

said receiver antenna (32) further having a side antenna lobe (38); said side antenna lobe (38) being generally coaxial to said central axis (34); said side antenna lobe (38) being used to receive said set of airborne platform beams of radiation (26);

said airborne platform (20) being flown along a flight path (40) which permits said airborne platform (20) to transmit said set of airborne platform beams of radiation (26) to said receiver antenna (32) using said side antenna lobe (38) while said central axis (34) of said receiver antenna (32) is pointed toward said satellite (11).

2. An apparatus as claimed in claim 1, in which said airborne platform (20) operates at high altitudes.

3. An apparatus as claimed in claim 1, in which said airborne platform (20) operates at an altitude of approximately 50,000 feet.

4. An apparatus as claimed in claim 1, in which said airborne platform (20) operates at an altitude of from 50,000 to 80,000 feet.

5. An apparatus as claimed in claim 1, in which said airborne platform (20) operates in a generally closed loop pattern (40).

6. An apparatus as claimed in claim 1, in which said surface (35) of said receiver antenna (32) is deliberately distorted to augment the gain of said side lobe (38).

7. An apparatus as claimed in claim 1, in which the taper of the radiation emanating from said feed structure (37) is decreased so that the edges of said receiver antenna (32) are illuminated more strongly and the gain of said side lobe (38) is augmented.

8. An apparatus as claimed in claim 1, in, which the gain of said side lobe (38) is increased by reducing the size of said receiver antenna (32).

9. An apparatus as claimed in claim 1, in which the gain of said side lobe (38) is enhanced by reducing the radius of said receiver antenna (32) in the direction in which said side lobe (38) is to be enhanced.

10. An apparatus as claimed in claim 1, in which said side lobe (38) is boosted by distorting the shape of the energy radiated from the feed structure so that said receiver antenna (32) is illuminated more strongly in an off-axis direction.

11. An apparatus as claimed in claim 1, in which said side lobe (38) is enhanced by moving said feed structure (37) slightly closer to said receiver antenna (32).

12. An apparatus as claimed in claim 1, in which said side lobe (38) is strengthened by forming a small dimple in said feed structure (37).

13. An apparatus as claimed in claim 1, in which said side lobe (38) is strengthened by making a small dent in said receiver antenna (32).

14. An apparatus as claimed in claim 1, in which said receiving antenna (32) is specially built to have an adjustable shaped beam that is specifically suited to detect signals from said airborne platform (20).

15. An apparatus as claimed in claim 1, in which said airborne platform (20) is an airplane.

16. An apparatus as claimed in claim 1, in which said airborne platform (20) a blimp.

17. An apparatus as claimed in claim 1, in which said airborne platform (20) is a dirigible.

18. An apparatus as claimed in claim 1, in which said airborne platform (20) is a helicopter.

19. An apparatus as claimed in claim 1, in which said airborne platform (20) is a balloon.

20. An apparatus as claimed in claim 1, in which said airborne platform (20) is an aerostat.

21. A method of augmenting a satellite broadcast system comprising the steps of:

operating a receiving antenna (32); said receiving antenna (32) having a main lobe (36) and a side lobe (38);

sensing a set of satellite beams of radiation (18) transmitted from a satellite (11) in Earth orbit (12) using said main lobe (36) of said receiving antenna (32);

operating an airborne platform (20) over the surface of the Earth; said airborne platform (20) including an airborne platform transponder (22) and an airborne platform antenna (24D and 24U);

conveying a set of airborne platform beams of radiation (26) toward the surface of the Earth (E) to said receiving antenna (32); and simultaneously sensing said set of airborne platform beams of radiation (26) using said side lobe (38) of said receiving antenna (32).

* * * * *

UNITED STATES PATENT AND TRADEMARK OFFICE
CERTIFICATE OF CORRECTION

PATENT NO. : 5,584,047
DATED : December 10, 1997
INVENTOR(S) : Edward F. Tuck

It is certified that error appears in the above-indentified patent and that said Letters Patent is hereby corrected as shown below:

Column 5, line 34:   "an" should be ---at--.

Column 5, line 44:   delete "42".

Column 7, line 29:   "⊔" should be --£--.

Column 7, line 31:   "⊔" should be --£--.

Column 8, line 6:    "seal-" should be --sea-.

Column 9, line 58:   delete "a" after --or--.

Signed and Sealed this

Nineteenth Day of August, 1997

Attest:

BRUCE LEHMAN

Attesting Officer                Commissioner of Patents and Trademarks